Jan. 2, 1968   I. GRIFFEL   3,360,998

FLEXIBLE CHAIN SPROCKET SUPPORT

Filed March 10, 1966

INVENTOR.
Irving Griffel
BY
Robert L. Spencer
ATTORNEY

United States Patent Office 3,360,998
Patented Jan. 2, 1968

3,360,998
FLEXIBLE CHAIN SPROCKET SUPPORT
Irving Griffel, Ann Arbor, Mich., assignor to General Motors Corporation, Detroit, Mich., a corporation of Delaware
Filed Mar. 10, 1966, Ser. No. 533,157
4 Claims. (Cl. 74—216.5)

The present invention relates to a chain drive and more particularly to an improved chain drive and support arrangement particularly adapted for use where chain life and noise are critical considerations. The present invention is used in an automotive transmission to transmit torque from the vehicle engine to the transmission gearing. It is particularly used in a vehicle front wheel drive assembly where noise is a critical factor.

In designing a chain and sprocket drive, various approaches were taken to provide a chain and sprocket drive which would be acceptably quiet for use in a front wheel drive for a vehicle. A conventional sprocket support of the rigid type was found to be unacceptable due to the fact that the noise transmitted to the vehicle was of a high pitch which increased with increase of torque being transmitted. One of the sources of noise was found to be the sprocket tooth mesh frequency which resulted in a noise peak at a given vehicle speed of 37 miles per hour and was caused by a diaphragm resonance of the sprocket support assembly. Because the sprocket excitation forces travel through the sprocket to the bearing housing, attempts were made to effectively isolate the sprocket teeth from the sprocket hub to decrease the chain noise at least in the area of resonance. Various designs were made wherein the drive sprocket teeth were isolated from the sprocket support assembly. One such design was to provide a ring having sprocket teeth on its outer periphery and to spline the ring on the sprocket support with rubber between the splines of the outer ring and sprocket support. Although this design whereby the drive sprocket was isolated from the support decreased the noise level, the design was expensive to manufacture and not entirely satisfactory from the standpoint of noise reduction. In the present design for sprocket noise isolation the bearing housings have the metal adjacent to the annular bearing contact support ring relieved thereby making the bearing housings flexible enough to reduce the transfer of energy from the sprocket through the bearing support to the transmission housing. The design reduced the chain noise because of the ability to absorb much of the energy transmitted to the bearing support by the sprocket. With the flexible support, a two piece drive sprocket was no longer necessary and an integral sprocket could be used, with consequent cost savings.

These and other advantages of this invention will be apparent from the following specification and drawings in which.

Figure 1:
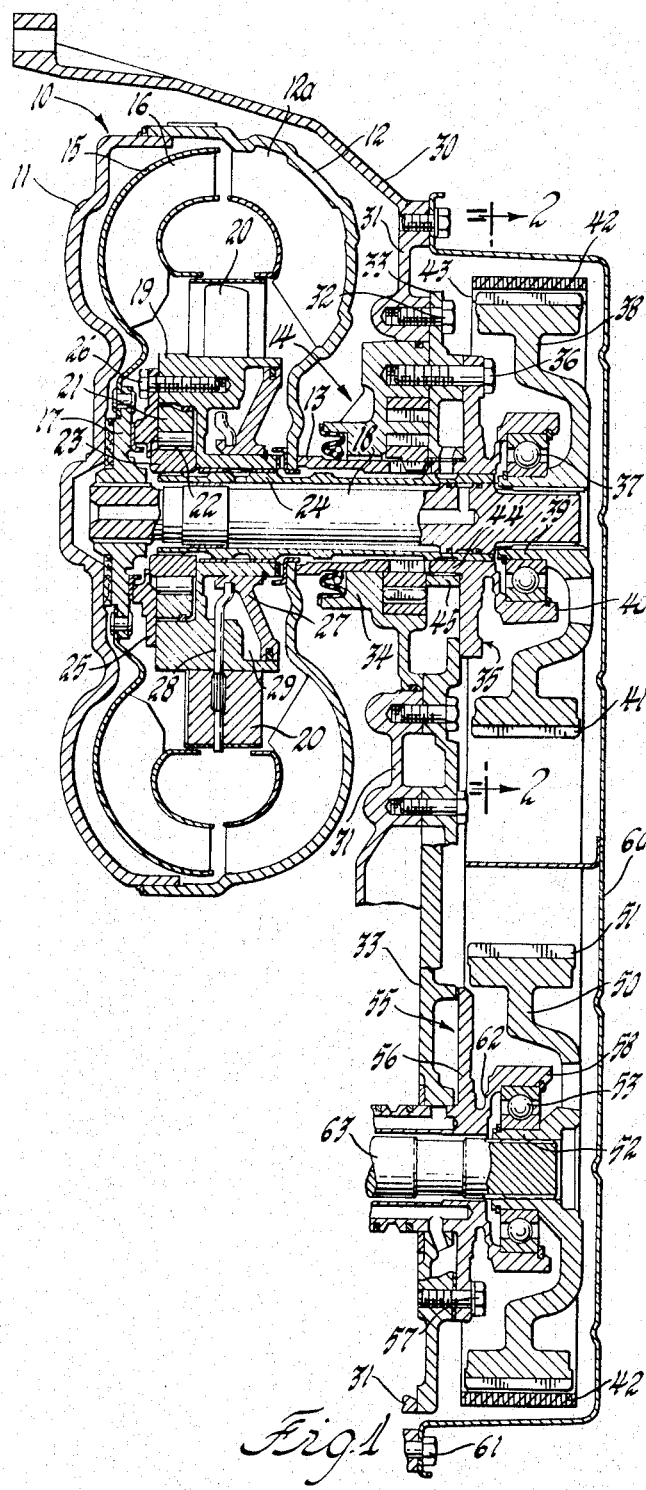
FIGURE 1 is a longitudinal section through a portion of a transmission incorporating a flexible sprocket support embodying the principles of this invention.

Referring to FIGURE 1, there is shown an engine driven hydrodynamic torque transmitting unit indicated generally at 10 for driving a chain drive sprocket 38 and a chain 42. Unit 10 preferably comprises a hydraulic torque converter but may be a fluid coupling if desired. Unit 10 is driven from an engine crankshaft (not shown) through a drum 11 which drives a shell 12 having impeller blades 12a fixed thereto. Shell 12 drives a sleeve shaft 13 for driving a pump 14. A turbine shell 15 carrying turbine blades 16 drives a power shaft 18 through a turbine hub 17 splined to shaft 18. A stator support 19 supports stator blades 20 in the path of travel of fluid flowing from turbine blades 16 to impeller blades 12a. A one-way brake 22 is disposed between a race 21 fixed for rotation with stator support 19 and a race 23 fixed to a stator shaft 24. A retainer 25 bolted to support 19 by bolts 26 retains the one-way brake assembly in assembled relationship. Blades 20 may be rotated by means of a piston 27 connected to blades 20 by means of a crank arm 28 rotatably supported in support 19. Control of piston 27 may be had by admitting pressure to and exhausting pressure from a control chamber 29 between support 19 and piston 27.

A transmission housing 30 is provided with an end support web 31. A support member 33 is secured to web 31 by bolts 32. A pump housing 34 and a bearing support 35 are secured to pump member 33 by bolts 36. Stator shaft 24 is splined to support 35 to hold stator shaft 24 against rotation. One way brake 22 functions to prevent reverse rotation of support 19 and to permit forward rotation of support 19 in the direction of rotation of impeller blades 12a and turbine blades 16.

Pump 14 is driven by impeller shell 12 through a sleeve shaft 13. Support plate 33 functions as a cover for pump housing 34 and as a support member for bearing supports 35 and 55. Bearing support 35 is bolted to support plate 33 by a series of bolts 36 which also retain pump housing 32 on plate 33. Ground sleeve shaft 24 is splined to bearing support 35 such that one-way brake 22 may permit forward rotation of reactor blade 20 but prevent reverse rotation of the blades. A chain drive sprocket 38 splined to shaft 18 for rotation therewith is supported by a ball bearing 37 disposed between an annular hub portion or base 39 of sprocket 38 and an annular support portion 40 on bearing support 35. Chain drive sprocket 38 is provided with sprocket teeth 41. A chain 42 having teeth 43 is driven by sprocket teeth 41. In the assembly, an annular axially extending boss 44 on bearing support 35 is received within and supported upon an annular hub 45 on support plate 33.

A driven sprocket 50 having sprocket teeth 51 is driven by chain 42. Sprocket 50 includes an annular hub 52 supported for rotation in a bearing 53 and is splined to an input shaft 63 for a transmission gearbox (not shown). A bearing support 55 is of similar construction to bearing support 35 in that it includes a central upstanding flange 56 bolted to support plate 33 by bolts 57, an axially extending boss 44 supported in plate 33 and an annular axially extending ring 58 in which bearing 53 is supported. A cover 60 encloses the sprocket and chain assembly and is bolted to housing 30 by bolts 61. Ring 58 is connected to flange 56 through a wall 62 which permits ring 58 to flex relative to flange 56.

Figure 2:
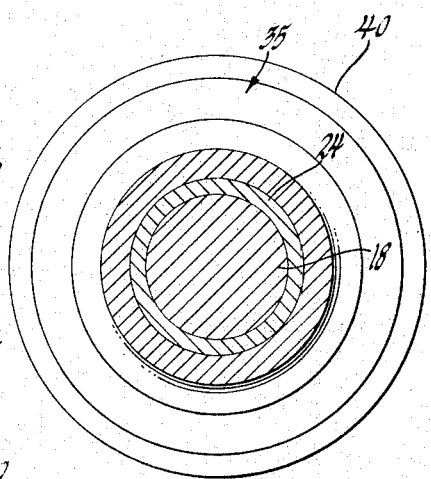
FIGURE 2 is a sectional view of a sprocket bearing support taken along the line 2—2 of FIGURE 1.
Figure 3:
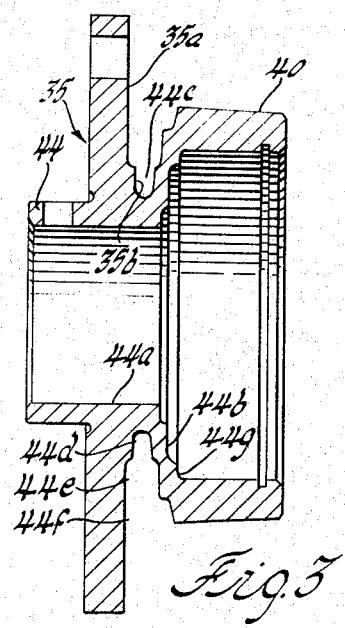
FIGURE 3 is an enlarged sectional view of the sprocket bearing support.

As best shown in FIGURES 2 and 3, bearing support 35 includes central upstanding mounting flange 35a, axially extending annular boss 44 extending from one side of mounting flange 35a, and an annular axially extending bearing support ring 40 spaced from mounting flange 35a. In the assembly flange 35a and boss 44 coact with support plate 33 such that the boss 44 and the portion 44a of boss 44 which extends axially outwardly from flange 35 are very rigid. The annular bearing support ring 40 is however joined to boss portion 44a by a relatively thin wall section 44b with the metal in the space 44c between wall section 44b and flange 35a removed as shown. As shown the metal removed to form space 44c is removed to provide three annular space portions 44d, 44e, 44f which are progressive in width. In the zone radially adjacent boss 44a, the wall 44b is separated from flange 35a by a relatively narrow space 44d. The space 44e radially outwardly from space 44d is of greater width than space 44d, while space 44f radially outwardly from space 44d is of greater width than space 44e. In this manner flange 35a is provided with a relatively thick or wide upstanding base portion 35b immediately radially outwardly from boss portion 44a and a relatively narrow portion 35a of uniform width radially outwardly from base portion 35b. On the other hand, the stepped vertical wall by which annular bearing support ring 44 is joined to boss portion 44a is composed of stepped relatively thin wall portions 44b and 44g, with wall portion 44g offset axially from upstanding wall portion 44b. As stated, bearing support 55 is of similar construction to bearing support 35 and needs not to be further described.

In actual test it has been found that by forming the bearing support housings 35 and 55, as described, the chain noise level is greatly reduced. By relieving the metal in the area between flange 35a and bearing support ring 40, the bearing housings become flexible enough to reduce the energy transfer from the sprockets to the transmission housing. In the actual construction the support housing functions as a cantilever with a radial rate of 180,000 pounds per inch and reduces chain noise because of its ability to absorb much of the energy imparted to it by the sprocket. Prior to this improvement it was necessary to use two different sprockets, one of which comprised a hub and separate sprocket tooth portion splined to the hub with rubber damping means between the hub and sprocket tooth portion. With the present design wherein the metal adjacent the bearing support ring 40 and flange 35a is removed to permit flexure of the bearing support ring 40 relative to boss portion 44a and flange portion 35a, two sprockets of identical integral design may be used with more quiet performance and with savings in cost.

What is claimed is:

1. A chain drive comprising a support housing, a drive shaft supported for rotation in said housing, a toothed sprocket driven by said drive shaft, a chain driven by said sprocket and adapted to be subjected to variable loads, a sprocket support including a wall portion secured to said housing and a bearing support ring spaced axially from said wall portion, a bearing in contact with said bearing support ring for rotatably supporting said sprocket, and a flexible wall connecting said bearing support ring to said first-named wall portion for permitting cantilever movement of said bearing support ring relative to said first-named wall portion in response to variation of the load on said chain.

2. A chain drive comprising a main support housing, a drive shaft supported for rotation in said housing, a toothed sprocket driven by said drive shaft, a chain driven by said sprocket teeth and adapted to be subjected to variable loads, a sprocket support including an upstanding wall portion secured to said housing, an annular hub portion extending axially from said wall portion and a bearing support portion extending in an axial direction with respect to said hub portion, a bearing supported upon said bearing support portion, a hub on said sprocket coaxial with said bearing support portion and supported for rotation in said bearing, and a flexible side wall connecting said bearing support portion to said first-mentioned hub, said flexible side wall permitting flexure of said bearing support portion relative to said first-named hub in response to variation of the load on said sprocket.

3. A chain drive comprising a support housing, a drive shaft rotatably supported in said housing, a toothed sprocket having a hub driven by said drive shaft, a chain driven by said sprocket teeth and adapted to be subjected to variable loads, a bearing support having an upstanding flange secured to said housing, an annular hub extending axially from the base of said flange toward said sprocket hub, an annular bearing support ring coaxial with said sprocket hub, a bearing disposed between said annular bearing support ring and said sprocket hub, and means connecting said annular bearing support ring to said annular flange hub for permitting flexing of said annular bearing support ring relative to said annular flange in response to variation of the load applied to said sprocket.

4. A chain drive as set forth in claim 3 wherein said annular hub and said annular bearing support ring are connected by a wall spaced from said flange and said annular hub and annular bearing support ring are relatively stiff relative to said wall, said wall permitting said annular bearing support ring to flex relative to said upstanding flange in response to variation of the load applied to said sprocket.

References Cited
UNITED STATES PATENTS

| | | | |
|---|---|---|---|
| 2,804,358 | 8/1957 | Eriksson | 308—184 |
| 3,001,840 | 9/1961 | Musser | 308—184 X |
| 3,041,889 | 7/1962 | Haushalter | 308—184 X |
| 3,049,941 | 8/1962 | Rumsey | 74—574 |
| 3,195,429 | 7/1965 | Cowley | 74—411 X |

MILTON KAUFMAN, *Primary Examiner.*

J. A. WONG, *Assistant Examiner.*